US005918165A

United States Patent [19]

Takatsuka

[11] Patent Number: 5,918,165

[45] Date of Patent: Jun. 29, 1999

[54] RADIO SELECTIVE-CALLING RECEIVER HAVING A PREDETERMINED MESSAGE DISPLAY FUNCTION AND MESSAGE COPYING METHOD

[75] Inventor: Kunihiro Takatsuka, Shizuoka, Japan

[73] Assignee: NEC Corporation, Tokyo, Japan

[21] Appl. No.: 08/736,503

[22] Filed: Oct. 24, 1996

[30] Foreign Application Priority Data

Oct. 27, 1995 [JP] Japan .................................... 7-279996

[51] Int. Cl.[6] ........................................................ H04B 1/16

[52] U.S. Cl. ................. 455/186.1; 455/38.4; 340/825.44

[58] Field of Search .................................... 455/66, 186.1, 455/412, 418, 419, 420, 227, 228, 38.4; 340/825.44

[56] References Cited

U.S. PATENT DOCUMENTS

| | | | |
|---|---|---|---|
| 5,404,568 | 4/1995 | Yamagishi | 455/517 |
| 5,430,439 | 7/1995 | Bodet et al. | 340/825.44 |
| 5,561,702 | 10/1996 | Lipp et al. | 455/186.1 |
| 5,574,439 | 11/1996 | Miyashita | 455/38.1 |
| 5,652,572 | 7/1997 | Kido et al. | 455/38.4 |

FOREIGN PATENT DOCUMENTS

| | | |
|---|---|---|
| 61-92047 | 5/1986 | Japan . |
| 3263931 | 11/1991 | Japan . |
| 595319 | 4/1993 | Japan . |
| 7236168 | 9/1995 | Japan . |
| 9139969 | 5/1997 | Japan . |
| 2168516 | 6/1986 | United Kingdom . |

OTHER PUBLICATIONS

Ukigawa Kazuyoshi; "Ichitaro Ver. 4 NECPC–9800 Shiri–zu reference Commentary Editor"; Jyasutoshisutemu, K.K.; Jul. 26, 1989; pp. 142–145.

*Primary Examiner*—Edward F. Urban
*Attorney, Agent, or Firm*—Sughrue, Mion, Zinn, Macpeak & Seas, PLLC

[57] ABSTRACT

A list of pre-stored messages is displayed in a receiver (S111). An arbitrary message is selected (S112 through S117) and the selected message is transmitted together with a specific code (NA) (S118). A marginal number for writing messages is previously confirmed in a receiver to which the messages are copied (S212). Judgment is made upon whether specific codes are redundant by using the received message selection number and the specific codes, and a user selects to overwrite or move data if the numbers are redundant (S214 through S218).

4 Claims, 3 Drawing Sheets

RADIO SELECTIVE-CALLING RECEIVER HAVING A PREDETERMINED MESSAGE DISPLAY FUNCTION AND MESSAGE COPYING METHOD

BACKGROUND OF THE INVENTION

1. Field of the Invention

The present invention relates to a radio selective-calling receiver having a pre-stored message display function and a pre-stored message copying method thereof, and more particularly to a radio selective-calling receiver, having a memory in which a plurality of pieces of predetermined message data are registered in accordance with specific codes, which receives and demodulates a message signal following its own calling number and selects the pre-stored message data registered in the memory according to the specific code included in the message signal to display the thus-selected data on a display unit as a message, and a method for copying the pre-stored message between the receivers.

2. Description of the Related Art

In this type of a conventional radio selective-calling receiver (which will be referred to as a receiver hereinbelow) having a pre-stored message display function, when the message that a user has created is to be copied (registered) in another receiver, there is adopted a method by which that message is newly generated by operating keys or the like on another receiver or two receivers are electrically connected with each other using an optical interface or any other means to directly transfer data. An example of such a receiver that registers a message by transferring data between the receivers has been proposed in Japanese patent laid-open publication No. 5-95319.

The above-described prior art radio selective-calling receiver having a pre-stored message display function has in a problem as that the copying operation can not be easily performed if a specific code for the message that the user has created has been already used as a number for a different message in another receiver. Further, when the specific code for the copied message is different among the receivers, a method for transmitting a message with a fixed form is complicated.

SUMMARY OF THE INVENTION

It is, therefore, an object of the present invention to provide a radio selective-calling receiver for eliminating the above-mentioned drawbacks.

Another object of the present invention is to provide a radio selective-calling receiver capable of copying a pre-stored message even if the same specific code corresponding to the pre-stored message has been already registered.

In a first embodiment of a radio selective-calling receiver adapted for use with a user comprising:

- means for displaying a predetermined message corresponding to a specific code;
- a message registering means for registering a predetermined message associated with a specific code; means for receiving and demodulating a message signal; wherein when the message signal contains a calling number assigned to the receiver said means for receiving and demodulating selects the predetermined message registered in the message registering means associated with the specific code included in the message signal for display by the means for displaying; wherein said means for displaying is adapted for receiving a signal indicating copy of the predetermined message; wherein the message registering means compares the specific code included in the message signal with a specific code registered in the message registering means; and wherein if the specific code included in the message signal matches a specific code registered in the message registering means, the message registering means inquires of the user whether the predetermined message corresponding with the specific code registered in the message registering means is to be overwritten and fetching the specific code included in the message signal and the corresponding predetermined message into the message registering means upon receiving permission from the user.

In a second embodiment of a radio selective calling receiver comprising means for displaying a predetermined message corresponding to the specific code, a message registering means for registering a predetermined message associated with a specific code, means for receiving and demodulating a message signal wherein when the message signal contains a calling number assigned to the receiver said means for receiving and demodulating selects the predetermined message registered in the message registering means associated with the specific code included in the message signal for display by the means for displaying, wherein said means for displaying is adapted for receiving a signal indicating copy of the predetermined message; wherein the message registering means compares the specific code included in the message signal with a specific code registered in the message registering means; wherein if the specific code included in the message signal matches the specific code registered in the message registering means, the message registering means changes the specific code in the message registering means to any other unused specific code and fetches the specific code included in the message signal and the corresponding predetermined message into the message registering means.

According to the present invention, since the user can select a stereotyped sentence to be copied without any restraint and the user of a receiver to which the stereotyped sentence is to be copied can freely select a stereotyped sentence specification number of the stereotyped sentence to be copied, the stereotyped sentence can be rapidly copied between the receivers. Further, it can prevent the content of the stereotyped sentence from being changed irrespective of a will of the user when copying the stereotyped sentence.

BRIEF DESCRIPTION OF THE DRAWING

These and other objects, features and advantages of this invention will become more fully apparent from the following detailed description taken with the accompanying drawings in which.

In the drawings, the same reference numerals denote the same structural elements.

DESCRIPTION OF THE PREFERRED EMBODIMENT

The present invention will be described with reference to the accompanying drawings.

Figure 1:
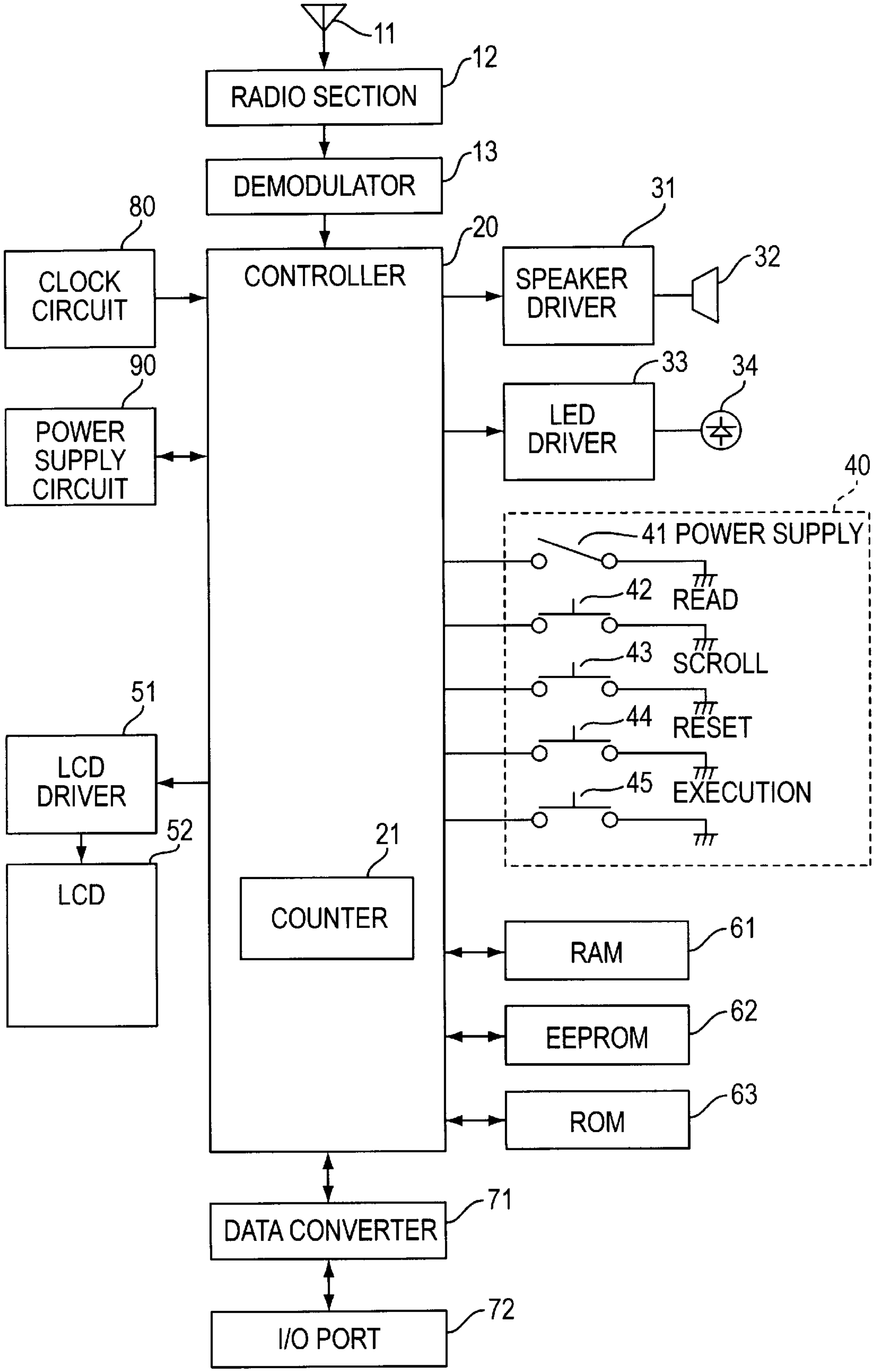
FIG. 1 is a block diagram of a radio selective-calling receiver, showing a preferred embodiment of the present invention.

FIG. 1 is a block diagram showing a prefered embodiment of a radio selective-calling receiver having a pre-stored message display function (which will be referred to as a receiver hereinbelow) according to the present invention. The receiver in this embodiment receives a selective-calling signal from a base station (not shown) adopting paging system at an antenna 11. This selective-calling signal is a radio frequency signal using as a modulated signal a digital signal including a calling number of each receiver, message information, a message information recognition code (which will be referred to as a shift-in code), and a specific code corresponding to a message. The specific code is registered with the corresponding message in advance. A caller can transmit the message information by inputting the specific code following the shift-in code. The selective-calling signal is amplified by a radio section 12, demodulated by a demodulator 13 and wave-shaped to be turned into a digital signal which can be read by a controller 20 for controlling the entire receiver. The controller 20 extracts a calling number, message information, a shift-in code and a specific code from the digital signal by an annunciation controlling means (not shown) included therein, and collates its own calling number previously written in an electrically erasable/programmable read-only memory (EEPROM) 62 with the calling number extracted from the digital signal. When the both numbers coincide, the controller 20 informs (calling annunciation) that there is a call. That is, the annunciation controlling means in the controller 20 drives a speaker driver (drive amplification circuit) 31 and an LED driver 33 in calling annunciation, and controls sounding by a speaker 32 and light emission by a light emitting diode (LED) 34. At the same time, the controller 20 stores (accommodates) the message information extracted by the annunciation controlling means, preferably, in a memory circuit (RAM) 61 using a random access memory by a contained message read controlling means (not shown). After this storing operation, the controller 20 drives an LCD (Liquid Crystal Display) driver 51 using the message read controlling means to display the message just stored in the RAM 61 on a display unit (LCD) 52. In addition, if the digital signal includes a shift-in code and a specific code, the controller 20 uses the annunciation controlling means to collate the specific code previously stored in the read-only memory (ROM) 63 or the EEPROM 62 with the content (message data), and displays the data that corresponds with the coincident specific code, i.e., the message on the display unit 52 by driving the LCD driver 51.

This receiver further comprises: a clock circuit 80 for generating timing clocks for each section in the receiver; a power supply circuit 90 for supplying power to each section in the receiver; a power supply switch 41 for turning on/off the power supply of the power supply circuit 90; a read switch 42 for reading the message stored in the RAM 61; a scroll switch 43 for scrolling the message and the content of the stereotyped sentence or their list displayed on the display unit 10; a reset switch 44 for erasing the message displayed on the display unit 10, stopping the sound from the speaker 6 or entering a menu mode; an operation section 40 having an execution switch 45 for determining the operation of the menu and others; an input/output port 72 for performing data communication with another receiver; and a data converter 71 for converting the content stored in the EEPROM 62 or the signal from the controller 20 into data for communication between the receivers and converting the data for communication between the receivers into data to be stored in the EEPROM 62 or processed in the controller 20.

Figure 2:
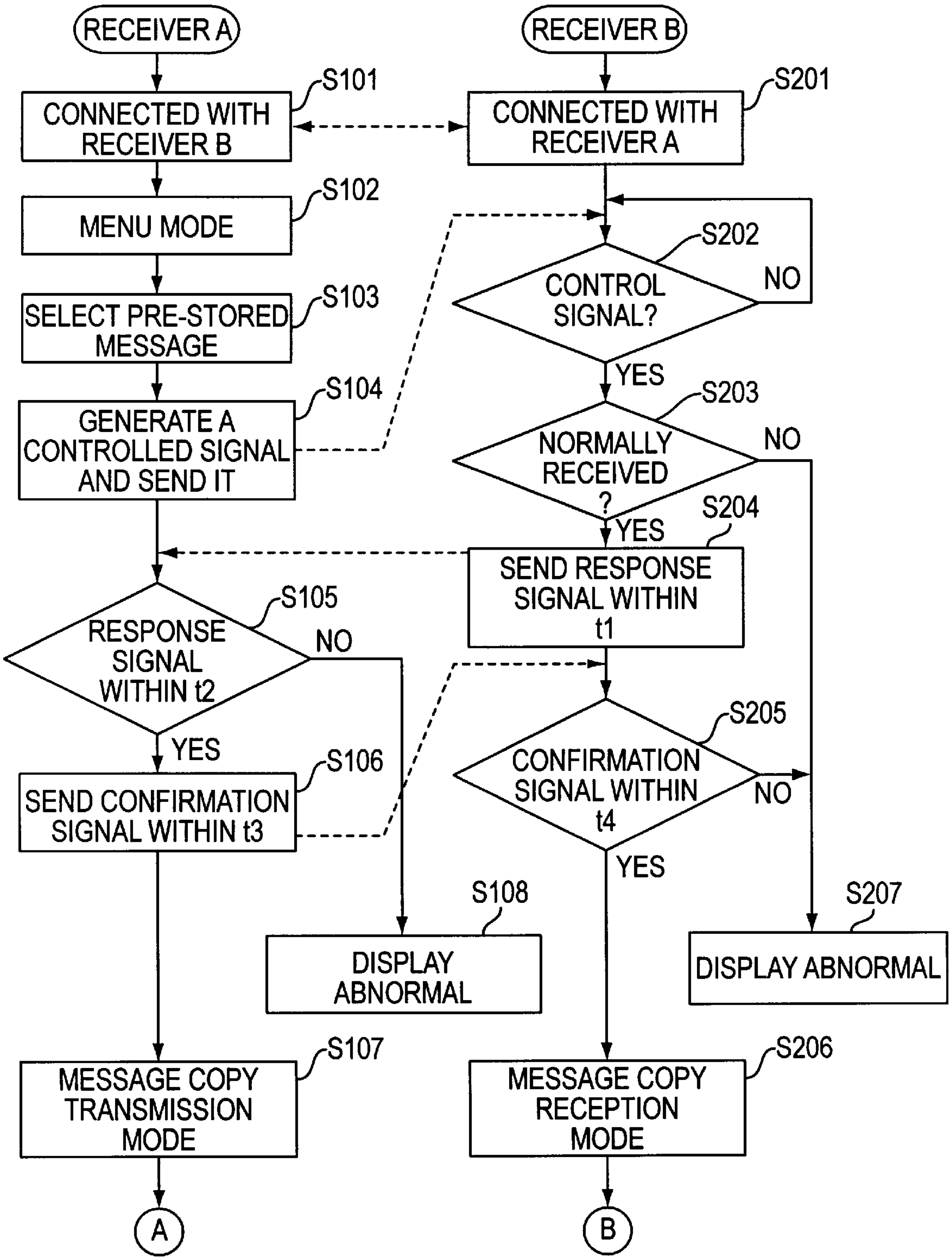
FIG. 2 is an operation flowchart showing transition to a message data copy mode.
Figure 3:
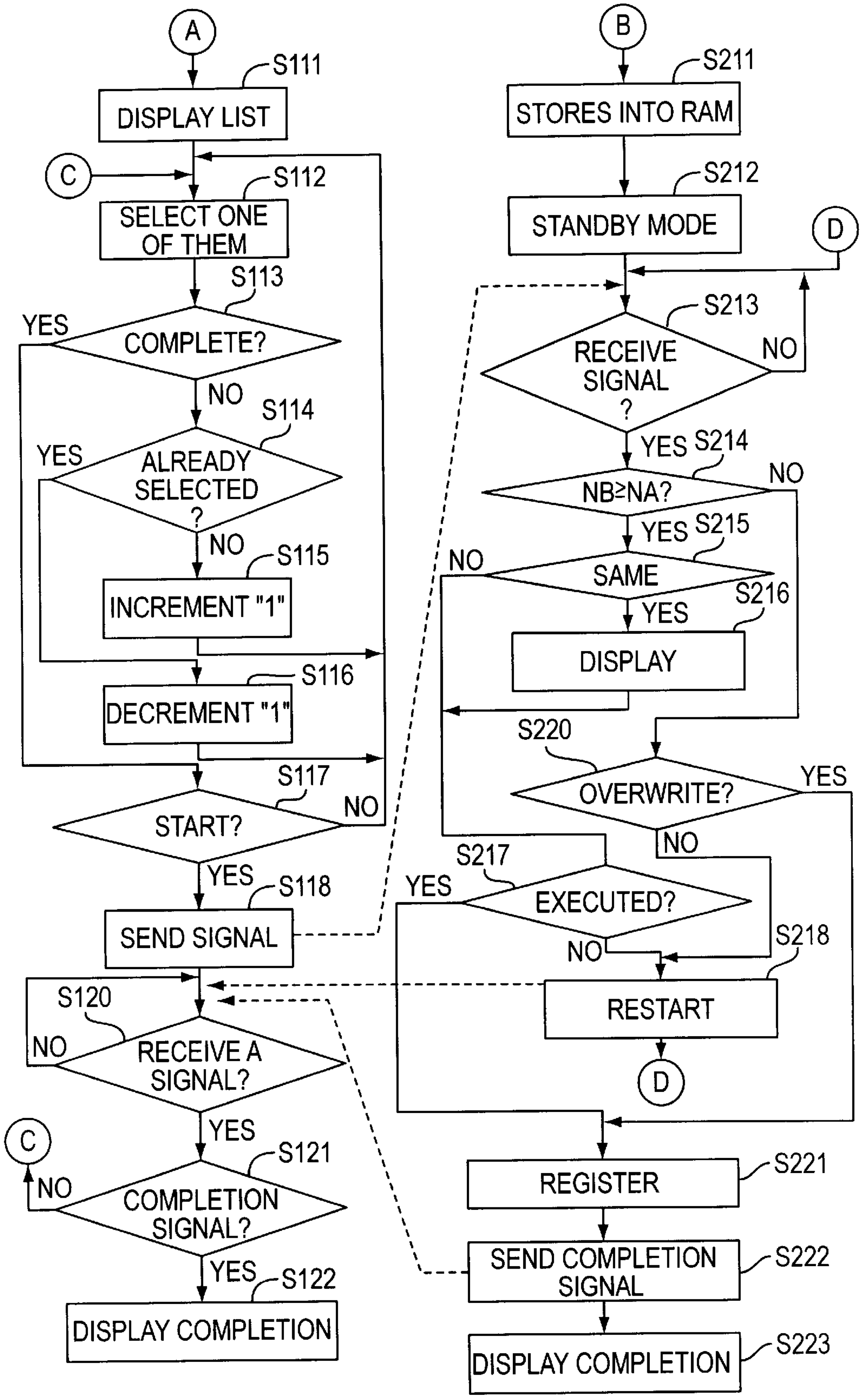
FIG. 3 is an operation flowchart for explaining the message data copy.

The present invention is characterized in that an arbitrary predetermined message corresponding to a specific code can be selected and registered using an arbitrary specific code of another receiver when copying the corresponding message between the receivers. Here, the operation will now be described with reference to flowcharts of FIGS. 2 and 3 showing the embodiment of the message copying method according to the present invention, as well as FIG. 1.

In the first place, a process for connecting the receivers to or from which the message is to be copied. Before copying the message, a receiver A from which the message is copied (message data is transmitted) and a receiver B to which the message is copied (the message data is received) are connected with each other at the respective input/output ports 72 by using a connection cable or any other means so that data transmission/reception is enabled. At this stage, if the receivers A and B are not turned on, the power supply is activated by changing over each power supply switch 41 to ON and an initial screen is displayed on the display unit 52 (steps S101 and S201 in FIG. 2). When a user (user A) pushes the reset switch 44 of the receiver A, the receiver A enters the menu mode (step S102) and copy of the pre-stored message is selected (step S103). With this operation, the controller 20 of the receiver A generates a control signal for copying the message. This signal is subjected to data conversion in the data converter 71 to be transmitted to the input/output port 72 of the receiver B through a connection cable or the like (step S104). Meanwhile, the receiver B repeatedly monitors if the control signal is received from outside (step S202). The control signal for copying the message supplied from the receiver A is converted into data in the data converter 71 in the receiver B (the respective input/output ports 72, the data converters 71 and the connection cable will be all referred to as a connection means) and processed in the controller 20 to be collated with the data for copying the message stored in the ROM 63, and the receiver B can execute copy of the message if reception of the signal is normal (step S203). Further, the receiver B transmits a normal reception response signal representing that the control signal for copying the message has been normally received from the controller 20 to the receiver A within a predetermined period (t1 seconds) through the connection means (step S204). If the receiver A has received the normal reception response signal from the receiver B within a period (t2 seconds) longer than the period (t1 seconds) required for transmitting the control signal for copying the message from the receiver A in the normal state and receiving the normal reception response signal by the receiver B, the normal reception response signal is processed in the controller 20 and is collated with normal reception response signal data stored in the ROM 63 (step S105), and the receiver A sends the control signal representing the normal state to the controller 20 of the receiver B within a predetermined period (t3 seconds) if reception of the normal reception response signal is normal (step S106). If the receiver B has received the control signal representing that the normal reception response signal was normally received from the receiver A within a period (t4 seconds) longer than the period (t3 seconds) required for transmitting the normal reception response signal by the receiver B in the normal state and receiving the control signal from the receiver A, connection is judged to be normally performed (step S205). Each controller 20 of the receivers A and B displays on the display unit 52 that connection has been normally carried out through the LCD driver 51, and the receiver A enters the message copy transmission mode while the receiver B enters the message copy reception mode (steps S107 and S206). If any defect was observed in the above operation, each controller 20 of the receivers A and B displays on the display unit 52 that connection is abnormal through the LCD driver 51 (steps S108 and S207). In case of abnormal connection, the state of connection by the connection means such as a connection cable is confirmed to repeat the above-mentioned processes.

When the receiver A enters the message copy transmission mode (step S107), the controller 20 reads all data of the specific code and the content thereof (corresponding message data) registered in the EEPROM 62 and stores them in the RAM 61. At the same time, the controller 20 transmits a display control signal to the LCD driver 51 to display a list of the pre-stored messages and a selection completion execution menu on the display unit 52 (step S111). The user uses the scroll switch 43 on the displayed screen to select a message which is to be copied. At this stage, a mark (which will be referred to as a cursor hereinbelow) indicating one specific code and the content thereof is displayed on the screen, and it moves in accordance with ON/OFF of the scroll switch 43 (step S112). Here, if an execution switch 45 is pushed, judgment is made upon whether a selected item corresponds to selection of a message or the completion execution menu (step S113). If the selected item is selection of a message (NO,of the step S113), judgment is made upon whether the selected first message has been already selected (step S114). If it has not been selected yet (NO of the step S114), the controller 20 writes data representing that the first message is selected, performs on the display unit 42 display for clarifying that the first message is selected, and increases a value of a counter 21 included in the controller 20 itself by +1 (step S115). If the first message has been already selected in the process of the step S114 (YES of the step S114), the controller 20 recognizes to cancel selection of the message, eliminates the data representing that the first message in the RAM 61 is selected, cancels display for clarifying that the first message is selected on the display unit 52, and decreases a value of the counter 21 by −1 (step S116). That is, cancel of the message that has been once selected is enabled by again selecting this message and pushing the execution switch 45. Upon completion of processes of the step S115 or S116, the processes of the step S112 and the following steps are repeated. If the item selected in the process of the step S112 was the completion execution menu (YES of the step S113), the controller 20 carries out on the display unit 52 display for determining whether copy is to be started (step S117). When the user pushes the reset switch 44, the control returns to the process for selecting the message at the step S112. Pushing the execution switch 45 by the user involves the controller 20 to recognize start of copy and transmit the specific code and the message data of the message by using the connection means so that a value (NA) in the counter 21 and the content of the RAM 61 are copied (step S118).

Meanwhile, when the receiver B enters the stereotyped sentence copy reception mode (step S206), the controller 20 reads all the data of the specific codes and the contents thereof (message data) registered in the EEPROM 62 and stores them in the RAM 61 (step S211). Further, the controller 20 retrieves the contents of the registered messages in the RAM 61 to write a number (NB) of unused specific codes (with which no data are written) in a counter 21 included in the controller 20 itself (step S212), and enters a standby mode for receiving a signal from the receiver A (step S213). In such a state, upon receiving the value (NA) of the counter 21, the specific code of the message and the message data from the receiver A, the controller 20 of the receiver B temporarily stores them in the RAM 61 and compares the value (NB) of its own counter with the value NA of the counter in the receiver A (step S214).

If NB>NA or NB=NA (YES of the step S214), the controller 20 recognizes that the received message can be all registered, compares the specific codes stored in its own RAM 61 with the received specific codes, and judges whether the specific codes are redundant (step S215). Here, if all the received specific codes are not used in the receiver B (NO of the step S215), the controller 20 immediately performs on the display unit 52 display representing whether copy is to be executed (step S217). If any of the received specific codes has been already used in the receiver B (YES of the step S215), the content corresponding with that specific code is moved to any other unused specific code in the receiver B, and the content stored in the RAM 61 is rewritten. Therefore, the message data is not written in accordance with the transmitted specific code in the receiver B, thereby enabling execution of copy. Further, the controller 20 of the receiver B carries out display on the display unit 52 to move and write the message (step S216), and the process of the step S217 is then effected. If the user (user B) has pushed the reset switch 44 in the process of the step S217 (NO of the step S217), the controller 20 recognizes that execution of copy is canceled and the operation is restarted from selection of the message, informs the receiver A of this recognition through the connection means (step S218) and returns to the standby mode for receiving a signal from the receiver A in the step S213. Note that the content of the message in the RAM 61 is restored. When the execution switch 45 is pushed in the process for judging whether copy is possible at the step S217, the controller 20 recognizes that copy is to be executed, adds the content of the message received from the receiver A in the content of the message written in its own RAM 61, and updates registration of the message by writing the content rewritten in the RAM 61 in its own EEPROM 62 (step S221).

If NB<NA in the process of the step S214 (NO), the controller 20 recognizes that the received messages and the messages stored therein are partially redundant, and carries out on the display unit 52 display representing whether overwriting is to be effected (step S220). If the user has pushed the execution switch 45 (YES of the step S220), the controller 20 of the receiver B writes the message data that is to be copied to correspond with the transmitted specific code over the message data stored in its own RAM 61, and writes the rewritten content in the RAM 61 in the EEPROM 62 to update registration of the message (step S221). If the user has pushed the reset switch 44 in the process at the step S220 (NO), the controller 20 recognizes that execution of copy is canceled and the operation is restarted from selection of the message, informs of the receiver A of this recognition through the connection means (step S218), and returns the standby mode for receiving the signal from the receiver A at the step S213.

Upon completion of the process at the step S221, the controller 20 of the receiver B sends a control signal representing completion of the copying operation to the controller 20 of the receiver A via the connection means (step S222) and carries out display representing completion of copy on its own display unit 52, thereby terminating the process (step S223).

After transmission of copy data to the receiver B at the step S118, the receiver A enters the standby mode for receiving the signal from the receiver B (steps S120 and S121), again executes the processes of the step S112 and the following steps when the signal indicating repetition of selection of the message is received (NO of the step S121), and performs display representing completion of copy on its own display unit 52 upon reception of the signal indicating completion of copy (YES of the step S121), thereby terminating the process (step S122).

As described above, according to the present invention, a message that is to be copied by the user can be selected and the same specific code can be used in both the receiver from which the message is copied and the receiver to which the stereotyped sentence is copied in case of copying the message between the receivers, and the user can hence eliminate complication of transmission of the selected message without taking into consideration a difference in the specific codes in the respective receivers. In addition, even if the specific code, with which the message is to be copied, is currently used, the receiver to which the message is to be copied can move the content of the sentence to another specific code to performs the copying operation, whereby the content of the message can not be unnecessarily lost.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A radio selective-calling receiver adapted for use with a user, comprising:

means for displaying a predetermined message corresponding to a specific code;

a message registering means for registering a predetermined message associated with a specific code;

means for receiving and demodulating a message signal;

wherein when the message signal contains a calling number assigned to the receiver, said means for receiving and demodulating selects the predetermined message registered in the message registering means associated with the specific code included in the message signal for display by the means for displaying;

wherein said means for displaying comprises receiving means for receiving a signal indicating copy of the predetermined message;

wherein the message registering means comprises comparing means for comparing the specific code included in the message signal with a specific code registered in the message registering means;

wherein if the specific code included in the message signal matches a specific code registered in the message registering means, the message registering means inquires of the user whether the predetermined message corresponding with the specific code registered in the message registering means is to be overwritten and fetching the specific code included in the message signal and the corresponding predetermined message into the message registering means upon receiving permission from the user.

2. A radio selective-calling receiver comprising:

means for displaying a predetermined message corresponding to a specific code;

a message registering means for registering a predetermined message associated with a specific code;

means for receiving and demodulating a message signal;

wherein when the message signal contains a calling number assigned to the receiver said means for receiving and demodulating selects the predetermined message registered in the message registering means associated with the specific code included in the message signal for display by the means for displaying;

wherein said means for displaying comprises receiving means for receiving a signal indicating copy of the predetermined message;

wherein the message registering means comprises comparing means for comparing the specific code included in the message signal with a specific code registered in the message registering means;

wherein if the specific code included in the message signal matches the specific code registered in the message registering means, the message registering means changes the specific code in the message registering means to any other unused specific code and fetches the specific code included in the message signal and the corresponding predetermined message into the message registering means.

3. A radio selective-calling receiver as claimed in claim 2, adapted for use with a user:

wherein the message registering means requires permission from the user before changing the specific code already in the message registering means.

4. A method for copying a message between radio selective-calling receivers each having a message display function, the receiver of which is provided with a message registering means for registering a plurality of pieces of message data in accordance with specific codes, receives and demodulates a message signal following its own calling number and selects message data registered in the message registering means in accordance with the specific code included in the message signal to display the thus-selected message data on a display unit as a message, the method for copying a message characterized by comprising the steps of:

connecting a receiver from which a message is copied and a receiver to which the message is copied with each other;

selecting a message to be copied in the receiver from which the message is copied and transmitting a signal indicating copy of the message including a specific code and corresponding message data of the selected message to the receiver to which the message is copied; and comparing the specific code received in the receiver to which the message is copied with a specific code previously registered in its own message registering means, judging whether any other unused specification code exists if the received specific code has been already used therein, inquiring of a user whether registration of the message data, which has been registered in accordance with the received specific code in the message registering means, is to be changed in accordance with the other unused specific code to execute copy if the other unused specific code exists; inquiring of the user whether the message data corresponding with the received specific code is to be overwritten to execute copy if any other unused specific code does not exists, and fetching the received specific code and the corresponding message data in the message registering means as its own message upon receiving permission of execution of copy from the user.

* * * * *